(12) United States Patent
Cherkasov et al.

(10) Patent No.: US 8,141,055 B2
(45) Date of Patent: Mar. 20, 2012

(54) METHOD FOR DYNAMIC DISCOVERY OF CODE SEGMENTS IN INSTRUMENTED BINARY MODULES

(75) Inventors: Sergey Cherkasov, San Jose, CA (US); Victor L. Havin, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 1116 days.

(21) Appl. No.: 11/967,520

(22) Filed: Dec. 31, 2007

(65) Prior Publication Data

US 2009/0172646 A1 Jul. 2, 2009

(51) Int. Cl.
*G06F 9/44* (2006.01)

(52) U.S. Cl. ........................................ 717/130

(58) Field of Classification Search .................. None
See application file for complete search history.

(56) References Cited

U.S. PATENT DOCUMENTS

| | | | |
|---|---|---|---|
| 5,193,180 A | | 3/1993 | Hastings et al. |
| 6,014,513 A | * | 1/2000 | Voelker et al. ................ 717/131 |
| 2005/0223363 A1 | * | 10/2005 | Black-Ziegelbein et al. . 717/127 |
| 2007/0240141 A1 | * | 10/2007 | Qin et al. ....................... 717/158 |
| 2008/0163180 A1 | * | 7/2008 | Havin et al. .................... 717/130 |
| 2009/0328185 A1 | * | 12/2009 | Berg et al. ....................... 726/13 |

OTHER PUBLICATIONS

"Code Segment" [Online Reference: http://en.wikipedia.org/wiki/Code_segment]; Retrieved Dec. 6, 2007.
"Entry Point" [Online Reference: http://en.wikipedia.org/wiki/Entry-Point]; Retrieved Dec. 6, 2007.
"Executable" [Online References: http:en.wikipedia.org/wiki/Executable]; Retrieved Dec. 6, 2007.

* cited by examiner

*Primary Examiner* — Philip Wang
(74) *Attorney, Agent, or Firm* — Cantor Colburn LLP; Daniel McLoughlin

(57) ABSTRACT

A method for dynamic discovery of code segments in instrumented binary modules is provided. A program comprising code segments is received. Potential code segments are determined, and the program is instrumented at potential code segments for dynamic code discovery. The instrumented program is run. In response to executing the potential code segments, the potential code segments are marked. The marked code segments are stored as confirmed code segments.

3 Claims, 2 Drawing Sheets

METHOD FOR DYNAMIC DISCOVERY OF CODE SEGMENTS IN INSTRUMENTED BINARY MODULES

TRADEMARKS

IBM® is a registered trademark of International Business Machines Corporation, Armonk, N.Y., U.S.A. Other names used herein may be registered, trademarks, trademarks or product names of International Business Machines Corporation or other companies.

BACKGROUND

Exemplary embodiments relate to discovery of code segments, and particularly to using special instrumentation for dynamic discovery of code segments during program execution.

One of the approaches, used for binary code instrumentation, is called static instrumentation in which executable modules are examined and modified before the executable modules are executed. The major problem for static instrumentation is to correctly identify all code and data segments.

A code segment may be defined as a set of contiguous instructions, which start with an entry point. Between two addresses, there may be several code segments that are confirmed as code or data. Typically, code segments extend from an entry point to a first unconditional branch instruction. An entry point may be a memory address corresponding to a point in the code of a computer program which is intended as the destination of a long jump. A memory address is an identifier for a memory location at which a computer program or a hardware device can store a piece of data.

Static binary code instrumentation relies on various techniques for finding all potential entry points and separating code from data. The code contains instructions while the data may be constants within the instructions. Some of these methods include using debugging information and import/export tables; branch following; scanning relocation tables; and liveness analysis.

During static instrumentation, potential entry points are analyzed and classified as confirmed code or confirmed data. However, for certain situations, these methodologies do not provide reliable results, such as, e.g., for a code segment inside a binary module which may look like a string or other data, and the code segment may not have complete debug information (as seen in Example 1). As a result, a potential entry point is not confirmed as either code or data, so the potential code segment is not instrumented as code, which causes runtime crashes.

Example 1 is below:

```
#include <stdio.h>
int count;
// Define a class FOO with a constructor;
class __declspec( dllexport ) FOO
{
public;
    // Define a constructor
    FOO( unsigned i ) : m__value(i)
    {
        // Print a message if the constructor is called
        printf("FOO #%u: %u\n", count, i );
        count += 1;
    }
public;
    unsigned m__value;
```

-continued

```
};
// Now define a global variable of type FOO.
// This should cause the constructor for the global variable
// to be called when the DLL is loaded.
//
  FOO fool = 0X706C65;
// When optimizations are on and the frame pointer is omitted, the
// the first few instructions in the initialize are:
// 1000C3E0 68 65 6C 70 00   push       706C65h
// 1000C3E5 B9 04 0C 01 10   mov        ecx,offset fool (10010C04h)
// 1000C3EA E8 11 4C FF FF   call       FOO::FOO (10001000h)
// 1000C3EF C3               ret
// Memory contents at the same address:
// 0x1000C3E0 68 65 6c 70 help
// 0x1000C3E4 00 b9 04 0c . ¶..
// 0x1000C3E8 01 10 e8 11 .. Ф.
// 0x1000C3EC 4c ff ff c3  L ├
// 0x1000C3F0 00 00 00 00 ....
// First instruction looks very much as NULL - terminated string
// In the absence of reliable debug info, it is instrumented as data.
```

EXAMPLE 1

It is desirable to have methods and techniques for discovery of code segments in instrumented binary modules.

SUMMARY

A method for dynamic discovery of code segments in instrumented binary modules is provided. A program comprising code segments is received. Potential code segments are determined, and the program is instrumented at potential code segments for dynamic code discovery. The instrumented program is run. In response to executing the potential code segments, the potential code segments are marked. The marked code segments are stored as confirmed code segments.

Additional features and advantages are realized through the techniques presented in exemplary embodiments. Other embodiments of the invention are described in detail herein and are considered a part of the claimed invention. For a better understanding of exemplary embodiments with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features are apparent from the following detailed description taken in conjunction with the accompanying drawings in which:

Figure 1:
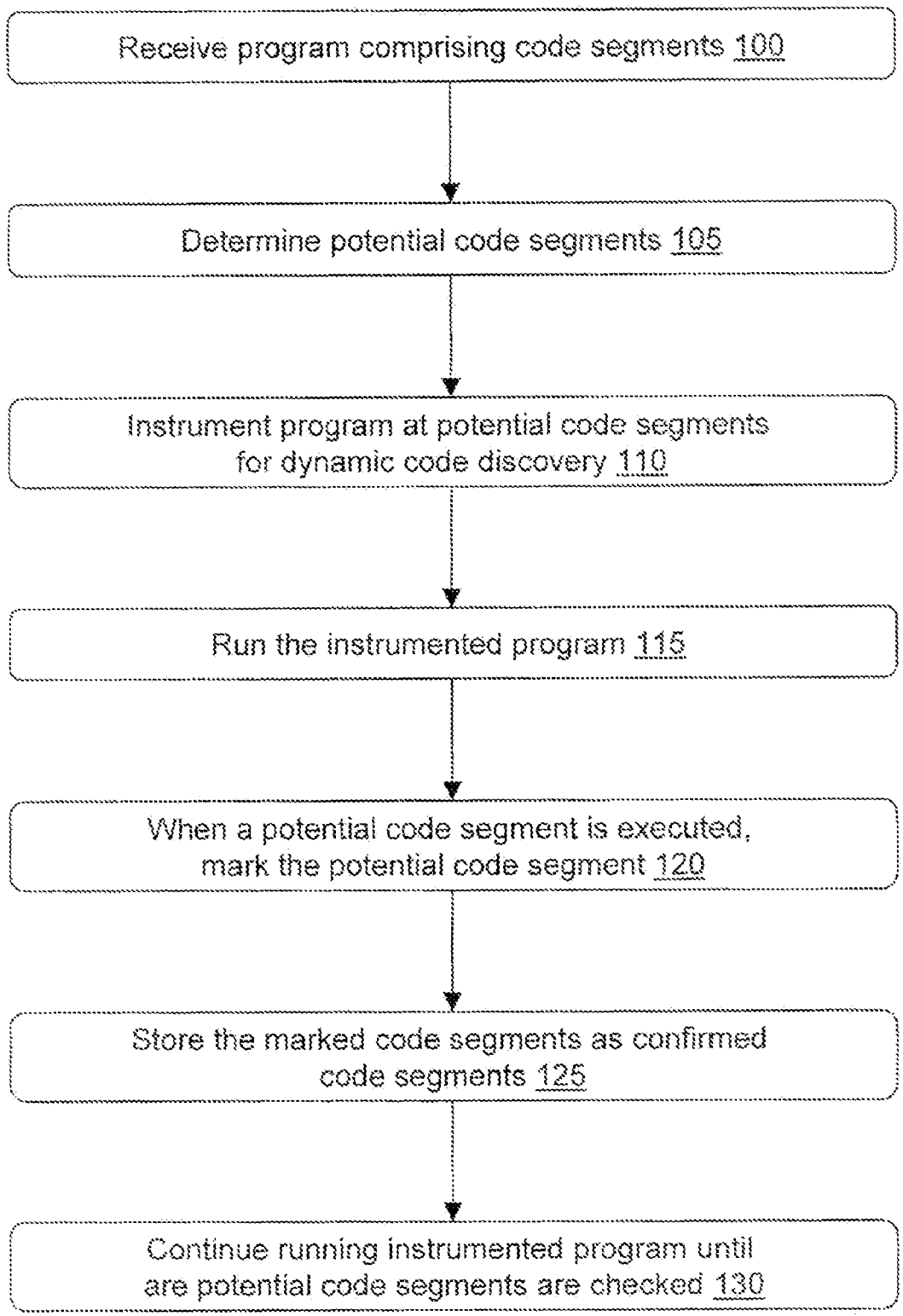
FIG. 1. illustrates a method for dynamical discovery of code segments in instrumented binary modules in accordance with exemplary embodiments.

The detailed description explains exemplary embodiments of the invention, together with advantages and features, by way of example with reference to the drawings.

DETAILED DESCRIPTION OF EXEMPLARY EMBODIMENTS

Exemplary embodiments utilize special instrumentation for dynamic discovery of code segments during program execution.

A technique is provided for dynamic discovery of code segments according to exemplary embodiments. First, the program is instrumented statically (See, U.S. Pat. No. 5,193, 180 herein incorporated by reference). All confirmed code segments are instrumented appropriately. All potential code segments are specially instrumented for dynamic code discovery. An instrumentation engine may instrument the code according to exemplary embodiments.

In accordance exemplary embodiments, at runtime, execution of the program is analyzed by the instrumented code. The instrumented program includes both the confirmed code segments and the potential code segments. When execution reaches the potential code segment, the potential code segment is marked as a confirmed code segment. Each potential code segment that is determined to be a confirmed code segments is stored, e.g., in a dynamic code discovery table (DCDT).

The more possible execution paths are exercised during test runs, the more complete the DCDT becomes. For example, more potential code segments may be determined. Those potential codes segments can be instrumented and the program is run. At the end of each run, the DCDT may be serialized back into the instrumented module or into a separate file.

Subsequent runs can use information from the DCDT to correctly instrument newly discovered code segments.

Instrumentation for dynamic code discovery may be implemented using various approaches, in accordance with exemplary embodiments. As a non-limiting example, all potential (not confirmed) entry points may be saved in a potential code discovery table (PCDT). Calls to a checking routine are inserted before all branch instructions with branch targets, which are unknown at instrumentation time. This checking routine checks actual branch targets against the PCDT and makes appropriate entries in the DCDT if there is a match. For example, if the branch instructions properly lead to a branch target, the potential code segment (or entry point) is input as an entry in the DCDT.

As another non-limiting example, calls to a marking routine may be inserted just before potential code segments. During reference resolution, only data access references are resolved to the old (potential) code segment start address (potential entry point). If execution reaches the potential code segment, the marking routine marks appropriate entry points in DCDT as confirmed code segments.

In accordance with exemplary embodiments, instrumentation engines gain more visibility into the target module (e.g., the code segment) by utilizing dynamic information obtained during the code execution.

By using additional runtime analysis created during program execution, the number of newly discovered code segments decreases with each run, thus requiring less runtime analysis in exemplary embodiments.

Exemplary embodiments improve static code analysis and instrumentation by implementing additional code instrumentation and runtime analysis. Exemplary embodiments use data structures, created by instrumenting the original binary code, for gathering additional runtime information to improve the results of the static code analysis. Exemplary embodiments may also include multi-path code instrumentation utilizing dynamic information obtained during code execution.

In accordance with exemplary embodiments, a dynamic code discovery table may be an array of DCDT_Entry data structures, sorted by offset. A non-limiting example of a DCDT_Entry definition is shown below in Example 2:

```
typedef struct
{
    AddrT Offset;
    AddrT OriginalOffset;
}DCDT_Entry;
```

EXAMPLE 2

Initially, the DCDT is empty. During runtime, as more code segments are dynamically discovered, more entries are added to the DCDT. Information, stored in the DCDT, is used by subsequent runs to correctly instrument dynamically discovered code segments.

FIG. 1. illustrates a method for dynamic discovery of code segments in instrumented binary modules in accordance with exemplary embodiments.

A program comprising code segments is received at 100. Potential code segments are determined at 105. At potential code segments, the program is instrumented for dynamic code discovery at 110.

The instrumented program is run at 115. When potential code segments are executed, the potential code segments are marked at 120. The marked code segments are stored as confirmed code segments at 125. The instrumented program is run until all potential code segments are checked at 130.

Below are two non-limiting examples that illustrate techniques for implementing dynamic code discovery using simplified assembly code in accordance with exemplary embodiments.

The following non-limiting example provides sample code in accordance with one implementation of exemplary embodiments, and the non-limiting example may be considered a branch target patching algorithm. In this implementation, address verification and dynamic code tables handling algorithms are outlined in pseudo code. Pieces of code modified or added by the instrumentation engine are shown in bold. In this non-limiting example, every branch instruction is instrumented by inserting a branch target address verification code before the actual branching. The original code is labeled Example 3, the instrumented code is labeled Example 4, and a Verify Branch procedure is labeled Example 5.

Original Code:

```
...
LEA     EDX, Target1
TEST    EAX
JNE     EDX
...
JMP     Target2
Target1:
...
Target2:
...
```

EXAMPLE 3

Instrumented Code

```
...
LEA     EDX, Target1
TEST    EAX
```

-continued

```
        PUSHFD
        PUSH   EDX
        CALL   VerifyBranch
        POP    EDX
        POPFD
        JNE    EDX
        ...
        PUSH   Target2
        CALL   VerifyBranch
        POP    Target2
        JMP    Target2
Target1:
        ...
Target2:
        ...
```

EXAMPLE 4

As illustrated by Example 4 above, every code branch in the instrumented code results in a call to the VerifyBranch procedure prior to the actual branching.

The VerifyBranch procedure is illustrated by the pseudo code below and is labeled as Example 5:

```
Void VerifyBranch(void* i_pBranch)
{
    // Lookup the potential code address
    if(Found(i_pBranch, PCDT_Table)
    {
        // If confirmed, update the dynamic code discovery tables
        AddEntry(new DCDT_Entry(i_pBranch), DCDT_Table);
        RemoveEntry(PCDT_Table, i_pBranch);
    }
}
```

EXAMPLE 5

As a result of executing the VerifyBranch procedure shown in Example 5, the dynamic code discovery table (DCDT) will be populated with a new entry each time the instrumented code is branching to a potential code segment block. The appropriate entry is moved from the PCDT table to the DCDT table, thus making the entry a confirmed code segment block. In the subsequent code instrumentation, the instrumentation engine resolves data/code ambiguities by consulting the DCDT table.

The following non-limiting example provides sample code in accordance with another implementation of exemplary embodiments, and the non-limiting may be considered as a data trapping algorithm. Pieces of code modified or added by the instrumentation engine are shown in bold. In the following implementation, the original code is labeled Example 6, the instrumented code is labeled Example 7, and a confirm target procedure is labeled Example 8.

Original Code:

```
        MOV    EDX, Target1
        MOV    EAX, [EDX]
        CMP    EAX, 040H
        JE     EDX
        JMP    Target2
Target1:
        NOP
Target2:
        ...
```

EXAMPLE 6

Instrumented Code

```
        Offset = Target1 – Target1_ins
        MOV    EDX, Target1
        MOV    EAX, [EDX]
        CMP    EAX, 040H
        JE     EDX-offset
        JMP    Target2
Target1_ins:
        CALL   ConfirmTarget( )
Target1:
        NOP
Target2:
        ...
```

EXAMPLE 7

Note that the data block in Example 7 is not modified by the instrumentation engine in any way. The data block is being relocated as any other basic code block or block of data in the instrumented code (of Example 7). However, all the references are patched accordingly. The important difference is that a "code trap" is inserted in front of suspected code blocks. All control transfer instructions are updated to hit the code trap before executing the code in the following block of code.

Pseudo code for the "ConfirmTarget" procedure:

```
Void ConfirmTarget( )
{
    // Retrieve the branch target from the current stack
    void* pBranch = GetTargetFromTheStack();
    // Update the dynamic code discovery tables
    AddEntry(new DCDT_Entry(pBranch), DCDT_Table);
    RemoveEntry(PCDT_Table, pBranch);
}
```

EXAMPLE 8

Figure 2:
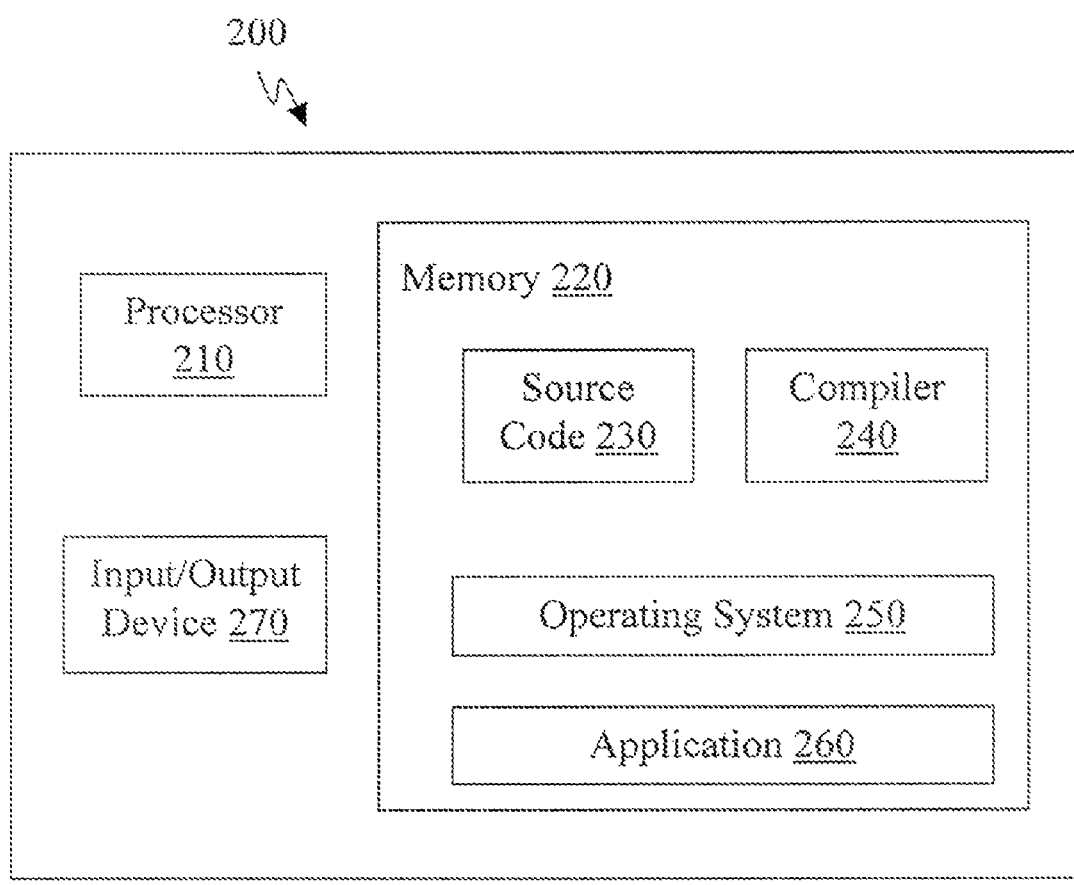
FIG. 2 illustrates an example of a computer having capabilities that may be utilized in implementations of exemplary embodiments.

FIG. 2 illustrates an example of a computer having capabilities, which may be included in exemplary embodiments. Various methods, techniques, and/or examples discussed above may utilize the capabilities of the computer 200.

The computer 200 includes, but is not limited to, PCs, workstations, positional and/or guidance devices, laptops, PDAs, palm devices, servers, and the like. Generally, in terms of hardware architecture, the computer 200 may include one or more processors 210, memory 220, and one or more input and/or output (I/O) devices 270 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interlace may include address, control, and/or data connections to enable appropriate communications among the aforementioned components.

The processor 210 is a hardware device for executing software that can be stored in the memory 220. The processor 210 can be virtually any custom made or commercially available processor, a central processing unit (CPU), a data signal processor (DSP), or an auxiliary processor among several processors associated with the computer 200, and the processor 210 may be a semiconductor based microprocessor (in the form of a microchip) or a microprocessor.

The memory 220 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 220 may incorporate electronic, magnetic, optical, and/or other types of storage media. Note that the memory 220 can have a distributed architecture, where various components are situated remote from one another, but can be accessed by the processor 210.

The software in the memory 220 may include one or more separate programs, each of which comprises an ordered listing of executable instructions for implementing logical functions. The software in the memory 220 includes a suitable operating system (O/S) 250, compiler 240, source code 230, and an application 260 (which may be one or more applications) of the exemplary embodiments. As illustrated, the application 260 comprises numerous functional components for implementing the features and operations of the exemplary embodiments. The application 260 of the computer 200 may represent various applications, scripts, programs, examples, code, etc. referred to herein, hut the application 260 is not meant to be a limitation.

The operating system 250 may control the execution of other computer programs, and provides scheduling, input-output control, file and data management, memory management, and communication control and related services. It is contemplated by the inventors that the application 260 for implementing exemplary embodiments is applicable on all commercially available operating systems.

The application 260 may be a source program, executable program (object code), script, or any other entity comprising a set of instructions to be performed. When a source program, then the program is usually translated via a compiler (such as the compiler 240), assembler, interpreter, or the like, which may or may not be included within the memory 220, so as to operate properly in connection with the O/S 250. Furthermore, the application 260 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 270 may include input devices such as, for example but not limited to, a mouse, keyboard, scanner, microphone, camera, etc. Furthermore, the I/O devices 270 may also include output devices, for example but not limited to, a printer, display, etc. Further, the I/O devices 270 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 270 also include components for communicating over various networks.

If the computer 200 is a PC, workstation, intelligent device or the like, the software in the memory 220 may further include a basic input output system (BIOS) (omitted for simplicity). The BIOS is a set of essential software routines that initialize and test hardware at startup, start the O/S 250, and support the transfer of data among the hardware devices. The BIOS is stored in some type of read-only-memory, such as ROM, PROM, EPROM, EEPROM or the like, so that the BIOS can be executed when the computer 200 is activated.

When the computer 200 is in operation, the processor 210 is configured to execute software stored within the memory 220, to communicate data to and from the memory 220, and to generally control operations of the computer 200 pursuant to the software. The application 260 and the O/S 250 are read, in whole or in part, by the processor 210, perhaps buffered within the processor 210, and then executed.

When the application 260 is implemented in software it should be noted that the application 260 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 260 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 260 is implemented in hardware, the application 260 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 200 includes non-limiting examples of software and hardware components that may be included in various devices and systems discussed herein, and it is understood that additional software and hardware components may be included in the various devices and systems discussed in exemplary embodiments.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments described, it will be understood that those skilled in the art, both now and in the future, may make various improvements and enhancements which fall within the scope of the claims which follow. These claims should be construed to maintain the proper protection for the invention first described.

What is claimed is:

1. A method for dynamic discovery of code segments in instrumented binary modules, in which a processor in a computer executes instructions to perform the method, the method comprising:

receiving on the computer an instrumented program comprising confirmed code segments and potential code segments, the confirmed code segments corresponding to code containing instructions;

wherein the confirmed code segments are stored in a dynamic code discovery table;

wherein the potential code segments are stored in a potential code discovery table;

inserting calls to a checking routine before all branch instructions with branch targets in the instrumented program at the potential code segments for dynamic code discovery on the computer, the branch targets being unknown at instrumentation time;

running the instrumented program on the computer;

executing the checking routine to check actual branch targets against the potential code segments in the potential code discovery table and to make appropriate entries in the dynamic code discovery table if there is a match;

marking the potential code segments as marked potential code segments when there is the match for the branch targets on the computer;

moving the marked potential code segments from the potential code discovery table to the dynamic code discovery table on the computer; and storing the marked potential code segments as the confirmed code segments in the dynamic code discovery table.

2. The method of claim 1, further comprising running the instrumented program continuously until all potential code segments are checked.

3. The method of claim 1, wherein instrumenting the instrumented program at the potential code segments for dynamic code discovery comprises inserting new instructions prior to the potential code segments; and wherein the new instructions confirm whether the potential code segments are the confirmed code segments.

* * * * *